(12) United States Patent
Huang et al.

(10) Patent No.: US 11,977,574 B2
(45) Date of Patent: May 7, 2024

(54) METHOD AND APPARATUS FOR ACQUIRING POI STATE INFORMATION

(71) Applicant: BEIJING BAIDU NETCOM SCIENCE AND TECHNOLOGY CO., LTD., Beijing (CN)

(72) Inventors: Jizhou Huang, Beijing (CN); Yibo Sun, Beijing (CN); Haifeng Wang, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/754,464

(22) PCT Filed: Jul. 20, 2021

(86) PCT No.: PCT/CN2021/107381
§ 371 (c)(1),
(2) Date: Apr. 1, 2022

(87) PCT Pub. No.: WO2022/174552
PCT Pub. Date: Aug. 25, 2022

(65) Prior Publication Data
US 2023/0409626 A1 Dec. 21, 2023

(30) Foreign Application Priority Data
Feb. 22, 2021 (CN) .......................... 202110199748.9

(51) Int. Cl.
*G06F 16/387* (2019.01)
*G06F 40/295* (2020.01)
(52) U.S. Cl.
CPC .......... *G06F 16/387* (2019.01); *G06F 40/295* (2020.01)

(58) Field of Classification Search
None
See application file for complete search history.

(56) References Cited

U.S. PATENT DOCUMENTS

2013/0166196 A1\* 6/2013 Narasimha ............ G06F 16/387
2019/0362266 A1 11/2019 Dai et al.
(Continued)

FOREIGN PATENT DOCUMENTS

CN 107977361 A 5/2018
CN 109145219 A 1/2019
(Continued)

OTHER PUBLICATIONS

Chinese International Search Report Dated Dec. 1, 2021 for PCT Application No. PCT/CN2021/107381, 4 Pages.
(Continued)

*Primary Examiner* — Son T Hoang
(74) *Attorney, Agent, or Firm* — Kwan & Olynick LLP

(57) ABSTRACT

A method and apparatus for acquiring point of interest (POI) state information are suggested, which relate to a big data technology in the technical field of artificial intelligence. A specific implementation scheme involves: acquiring a text including POI information within a preset period from the Internet; and recognizing the text by using a pre-trained POI state recognition model, to obtain a two-tuple in the text, the two-tuple including a POI name and POI state information corresponding to the POI name. The POI state recognition model acquires a vector representation of each first semantic unit in the text, and acquires a vector representation of each second semantic unit in the text based on semantic dependency information of the text; fuses the vector representation of each first semantic unit and the vector representation of each second semantic unit to obtain a fusion vector representation of each first semantic unit; and predicts labels of
(Continued)

the POI name and a POI state based on the fusion vector representation of each first semantic unit.

19 Claims, 8 Drawing Sheets

(56) References Cited

U.S. PATENT DOCUMENTS

| | | | |
|---|---|---|---|
| 2020/0004823 | A1 | 1/2020 | Chatterjee et al. |
| 2020/0081908 | A1 | 3/2020 | Huang et al. |
| 2020/0143159 | A1 | 5/2020 | Deguchi et al. |
| 2021/0019479 | A1* | 1/2021 | Tu ............................ G06F 16/93 |
| 2021/0209137 | A1* | 7/2021 | Hu ....................... G06F 16/2425 |
| 2021/0254994 | A1* | 8/2021 | Aït-Mokhtar ......... G06F 16/387 |
| 2021/0374758 | A1* | 12/2021 | Hochma .............. G06F 16/3344 |
| 2021/0390392 | A1* | 12/2021 | Lagos ................... G06F 16/245 |
| 2022/0107799 | A1* | 4/2022 | Wu ...................... G06F 16/2246 |
| 2022/0182792 | A1* | 6/2022 | Nies ...................... G06F 16/906 |
| 2022/0253612 | A1 | 8/2022 | Huang et al. |

FOREIGN PATENT DOCUMENTS

| | | |
|---|---|---|
| CN | 110020224 A | 7/2019 |
| CN | 110276023 A | 9/2019 |
| CN | 110851738 A | 2/2020 |
| CN | 111143708 A | 5/2020 |
| CN | 111339774 A | 6/2020 |
| CN | 111444726 A | 7/2020 |
| CN | 111783416 A | 10/2020 |
| CN | 109145219 B | 12/2020 |
| CN | 110851738 B | 3/2021 |
| CN | 110276023 B | 4/2021 |
| CN | 112925995 A | 6/2021 |
| CN | 110020224 B | 7/2021 |
| JP | 2010008142 A | 1/2010 |
| JP | 2020042779 A | 3/2020 |
| JP | 2022511593 A | 2/2022 |

OTHER PUBLICATIONS

Chinese Notice of Allowance Dated Oct. 18, 2021 for Chinese Application No. 202110199748.9, 3 Pages.
Chinese Office Action Dated Jul. 19, 2022 for Chinese Application No. 202110199748.9, 9 Pages.
Named Entity Recognition Application for News Text, 5 Pages.
First office action for JP2022-521351, issued on May 9, 2023, 3 pgs.
Notice of Allowance for JP2022-521351, issued on Sep. 5, 2023, 1 pg.
Toshihiro Rokuse, et al., A Proposal on Information Service System at the Time of Large-Scale Disaster Using Twitter, Aug. 20, 2013, 6 pgs.
Extended European Search Report for EP21870474.0, issued 9/2922, 9 pgs.

* cited by examiner

| Inputted text | Predicted label |
|---|---|
| 继 | O |
| 坪 | B-NEW |
| 山 | I-NEW |
| 图 | I-NEW |
| 书 | I-NEW |
| 馆 | I-NEW |
| 开 | O |
| 业 | O |
| 之 | O |
| 后 | O |
| ， | O |
| 坪 | B-NEW |
| 山 | I-NEW |
| 艺 | I-NEW |
| 术 | I-NEW |
| 博 | I-NEW |
| 物 | I-NEW |
| 馆 | I-NEW |
| 也 | O |
| 在 | O |
| 3 | O |
| 月 | O |
| 30 | O |
| 日 | O |
| 正 | O |
| 式 | O |
| 开 | O |
| 业 | O |
| ， | O |
| 其 | O |
| 在 | O |
| 坪 | B-NONE |
| 山 | I-NONE |
| 中 | I-NONE |
| 心 | I-NONE |
| 公 | I-NONE |
| 园 | I-NONE |
| 内 | O |

FIG.6

METHOD AND APPARATUS FOR ACQUIRING POI STATE INFORMATION

This application is a national application and, pursuant to 35 U.S.C. § 371, is entitled to and claims the right of priority based on PCT application no. PCT/CN2021/107381, filed Jul. 20, 2021, which claims priority to Chinese Patent Application No. 202110199748.9, entitled "METHOD AND APPARATUS FOR ACQUIRING POI STATE INFORMATION" and filed on Feb. 22, 2021, the entire contents of all of which are incorporated herein by reference.

FIELD OF THE DISCLOSURE

The present disclosure relates to the field of computer technologies, and in particular, to a big data technology in the technical field of artificial intelligence.

BACKGROUND OF THE DISCLOSURE

A Point of Interest (POI) is a term in a geographic information system, which generally refers to any geographical object that may be abstracted as a point. A POI may be a house, a shop, a post box, a bus station, a school, a hospital, and so on. The POI has a main function of describing a position of a thing or an event, so as to enhance the capability to describe and query the position of the thing or the event.

The POI plays a very important role in Internet map applications. With the POI, a user may easily find a place of interest and a route to the place on a map. However, due to the influence of urban planning and other factors, some POI information may change over time, such as a new POI, a relocated POI, a renamed POI, a closed POI and so on. If a POI database cannot be updated in a timely manner, users may not find information they are interested in when searching using a map, or even the users are misled. For example, after a user navigates to a shopping mall, if he/she finds that the shopping mall has been relocated or closed down, it may obviously bring very bad experience to the user.

At present, POI state information is acquired mainly by human power, such as collected by staff on site, or reported by users on their own initiative. However, on the one hand, such manners waste human resources and have high costs; on the other hand, such manners rely heavily on human initiative, so timeliness and accuracy are difficult to guarantee.

SUMMARY OF THE DISCLOSURE

The present disclosure provides a method and apparatus for acquiring POI state information, a device, a computer storage medium and a computer program product, so as to save labor costs and improve timeliness and accuracy.

According to a first aspect of the present disclosure, a method for acquiring POI state information is provided, including:
  acquiring a text including POI information within a preset period from the Internet; and
  recognizing the text by using a pre-trained POI state recognition model, to obtain a two-tuple in the text, the two-tuple including a POI name and POI state information corresponding to the POI name;
  wherein the POI state recognition model acquires a vector representation of each first semantic unit in the text, and acquires a vector representation of each second semantic unit in the text based on semantic dependency information of the text; fuses the vector representation of each first semantic unit and the vector representation of each second semantic unit to obtain a fusion vector representation of each first semantic unit; and predicts labels of the POI name and a POI state based on the fusion vector representation of each first semantic unit.

According to a second aspect of the present disclosure, a method for establishing a POI state recognition model is provided, including:
  acquiring training data, the training data including: a text and label annotation results of a POI name and a POI state included in the text; and
  taking the text as input to the POI state recognition model, and taking the label annotation results of the POI name and the POI state included in the text as target prediction results of the POI state recognition model, to train the POI state recognition model;
  wherein the POI state recognition model acquires a vector representation of each first semantic unit in the text, and acquires a vector representation of each second semantic unit in the text based on semantic dependency information of the text; fuses the vector representation of each first semantic unit and the vector representation of each second semantic unit to obtain a fusion vector representation of each first semantic unit; and predicts labels of the POI name and a POI state based on the fusion vector representation of each first semantic unit.

According to a third aspect of the present disclosure, an apparatus for acquiring POI state information is provided, including:
  a text acquisition unit configured to acquire a text including POI information within a preset period from the Internet; and
  a state recognition unit configured to recognize the text by using a pre-trained POI state recognition model, to obtain a two-tuple in the text, the two-tuple including a POI name and POI state information corresponding to the POI name;
  wherein the POI state recognition model includes:
  a semantic representation module configured to acquire a vector representation of each first semantic unit in the text;
  a semantic dependency representation module configured to acquire a vector representation of each second semantic unit in the text based on semantic dependency information of the text;
  a representation fusion module configured to fuse the vector representation of each first semantic unit and the vector representation of each second semantic unit to obtain a fusion vector representation of each first semantic unit; and
  a label prediction module configured to predict labels of the POI name and a POI state based on the fusion vector representation of each first semantic unit.

According to a fourth aspect of the present disclosure, an apparatus for establishing a POI state recognition model is provided, including:
  an acquisition unit configured to acquire training data, the training data including: a text and label annotation results of a POI name and a POI state included in the text; and
  a training unit configured to take the text as input to the POI state recognition model, and take the label annotation results of the POI name and the POI state included in the text as target prediction results of the POI state recognition model, to train the POI state recognition model;

wherein the POI state recognition model includes:
a semantic representation module configured to acquire a vector representation of each first semantic unit in the text;
a semantic dependency representation module configured to acquire a vector representation of each second semantic unit in the text based on semantic dependency information of the text;
a representation fusion module configured to fuse the vector representation of each first semantic unit and the vector representation of each second semantic unit to obtain a fusion vector representation of each first semantic unit; and
a label prediction module configured to predict labels of the POI name and a POI state based on the fusion vector representation of each first semantic unit.

According to a fifth aspect of the present disclosure, an electronic device is provided, including:
at least one processor; and
a memory in communication connection with the at least one processor; wherein
the memory stores instructions executable by the at least one processor, and the instructions are executed by the at least one processor to enable the at least one processor to perform the method as described above.

According to a sixth aspect of the present disclosure, a non-transitory computer-readable storage medium storing computer instructions, wherein the computer instructions are configured to cause a computer to perform the method as described above.

According to a seventh aspect of the present disclosure, a computer program product, including a computer program, wherein, when the computer program is executed by a processor, the method as described above is performed.

As can be seen from the above technical solutions, in the present disclosure, POI names and POI state information corresponding to the POI names are mined from Internet texts including POI information, which makes full use of timely responses of the Internet to POI state change events, saves labor costs and improves timeliness and accuracy compared with the manner of determining POI information with state changes manually.

It should be understood that the content described in this part is neither intended to identify key or significant features of the embodiments of the present disclosure, nor intended to limit the scope of the present disclosure. Other features of the present disclosure will be made easier to understand through the following description.

Other effects of the above alternatives are described below with reference to specific embodiments.

BRIEF DESCRIPTION OF DRAWINGS

The accompanying drawings are intended to provide a better understanding of the solutions and do not constitute a limitation on the present disclosure. In the drawings.

FIG. 6 is an example diagram of prediction of labels of texts according to an embodiment of the present disclosure;

DETAILED DESCRIPTION OF PREFERRED EMBODIMENTS

Exemplary embodiments of the present disclosure are illustrated below with reference to the accompanying drawings, which include various details of the present disclosure to facilitate understanding and should be considered only as exemplary. Therefore, those of ordinary skill in the art should be aware that various changes and modifications can be made to the embodiments described herein without departing from the scope and spirit of the present disclosure. Similarly, for clarity and simplicity, descriptions of well-known functions and structures are omitted in the following description.

Figure 1:
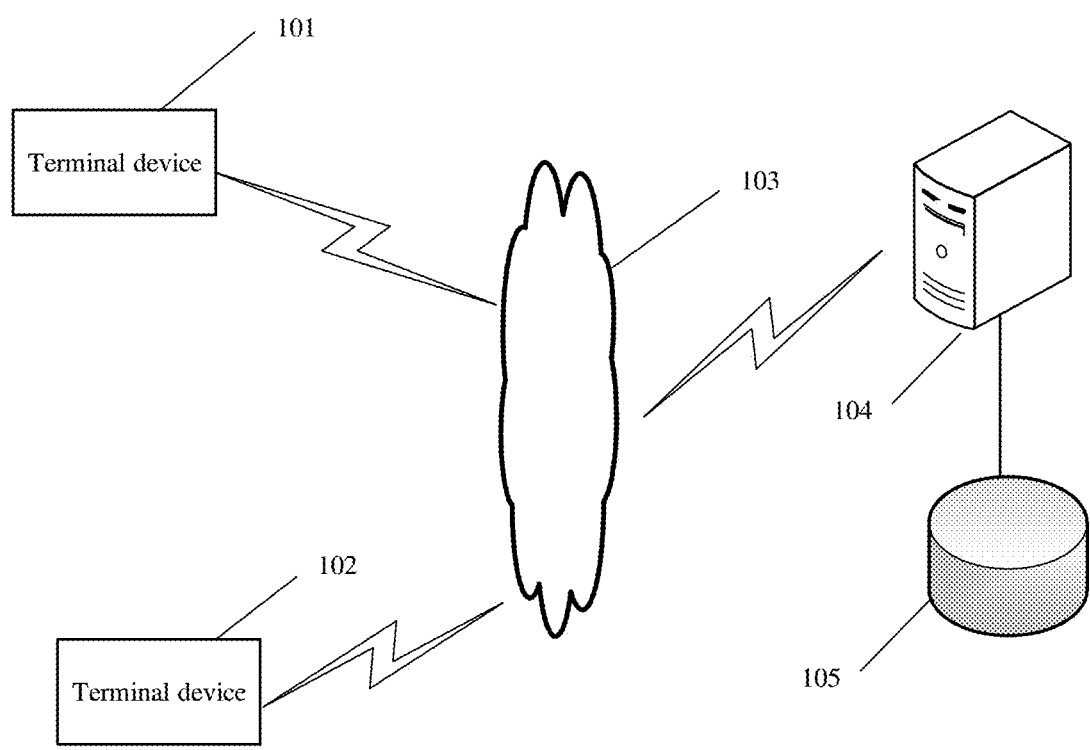
FIG. 1 shows an exemplary system architecture of a method or an apparatus to which embodiments of the present disclosure are applicable.

FIG. 1 shows an exemplary system architecture of a method or an apparatus to which embodiments of the present disclosure are applicable. As shown in FIG. 1, the system architecture may include terminal devices 101 and 102, a network 103 and a server 104. The network 103 is a medium configured to provide communication links between the terminal devices 101 and 102 and the server 104. The network 103 may include a variety of connection types, such as wired, wireless communication links, or fiber-optic cables.

A user may interact with the server 104 through the network 103 by using the terminal devices 101 and 102. Various applications, such as map applications, web browser applications, and communication applications, may be installed on the terminal devices 101 and 102.

The terminal devices 101 and 102 may be a variety of user devices capable of running map applications, including, but not limited to, smart phones, tablets, PCs, smart TVs, and so on. The apparatus for acquiring POI state information and the apparatus for establishing a POI state recognition model according to the present disclosure may be arranged and run in the server 104 or run in a device independent of the server 104. The above apparatuses may be implemented as a plurality of software or software modules (for example, to provide distributed services) or as a single software or software module, which is not specifically limited herein. The server 104 may interact with a POI database 105. Specifically, the server 104 may either acquire data from the POI database 105 or store data in the POI database 105. Map data including POI information is stored in the POI database 105.

For example, the apparatus for acquiring POI state information is arranged and runs in the server 104. The server 104 acquires POI state information with the method according to the embodiment of the present disclosure, and then updates the POI database 105 by using the acquired POI state information. The server 104 can query the POI database 105 in response to query requests from the terminal devices 101 and 102, and return queried POI information to the terminal devices 101 and 102.

The server 104 may be a single server or a server group composed of a plurality of servers. In addition to existing in the form of a server, 104 may also be another computer system or processor with high computing performance. It is to be understood that numbers of the terminal device, the network, the server and the database in FIG. 1 are only illustrative. Any number of terminal devices, networks, servers and databases may be available according to implementation requirements.

In the present disclosure, based on richness and real-time performance of Internet big data, POI state information is mined from Internet texts by taking Internet big data as data sources. A core idea involves acquiring a text including POI information within a preset period from the Internet; recognizing the text by using a pre-trained POI state recognition model, to obtain a two-tuple in the text, the two-tuple including a POI name and POI state information corresponding to the POI name From the point of view of the overall solution of the present disclosure, two parts are involved. One part is the establishment of the POI state recognition model, and the other part is the acquisition of the POI state information by using the POI state recognition model. The two parts are described in detail below with reference to embodiments respectively.

Figure 2:
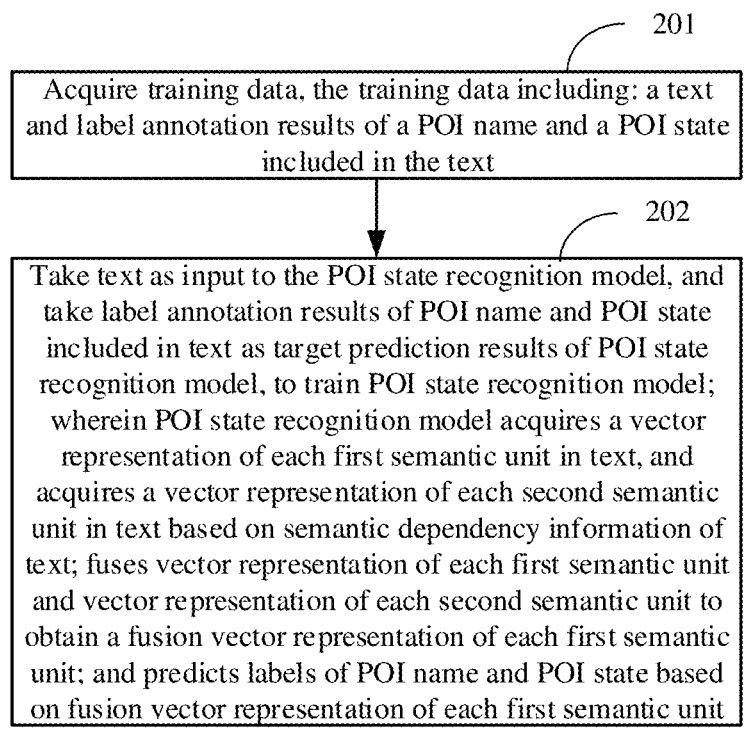
FIG. 2 is a flowchart of a method for establishing a POI state recognition model according to an embodiment of the present disclosure.

FIG. 2 is a flowchart of a method for establishing a POI state recognition model according to an embodiment of the present disclosure. As shown in FIG. 2, the method may include the following steps.

In 201, training data is acquired, wherein the training data includes: a text and label annotation results of a POI name and a POI state included in the text.

In 202, the text is taken as input to the POI state recognition model, and the label annotation results of the POI name and the POI state included in the text are taken as target prediction results of the POI state recognition model, to train the POI state recognition model.

The POI state recognition model acquires a vector representation of each first semantic unit in the text, and acquires a vector representation of each second semantic unit in the text based on semantic dependency information of the text; fuses the vector representation of each first semantic unit and the vector representation of each second semantic unit to obtain a fusion vector representation of each first semantic unit; and predicts labels of the POI name and a POI state based on the fusion vector representation of each first semantic unit.

Step 201 "acquiring training data" is described in detail below with reference to embodiments.

Figure 3:
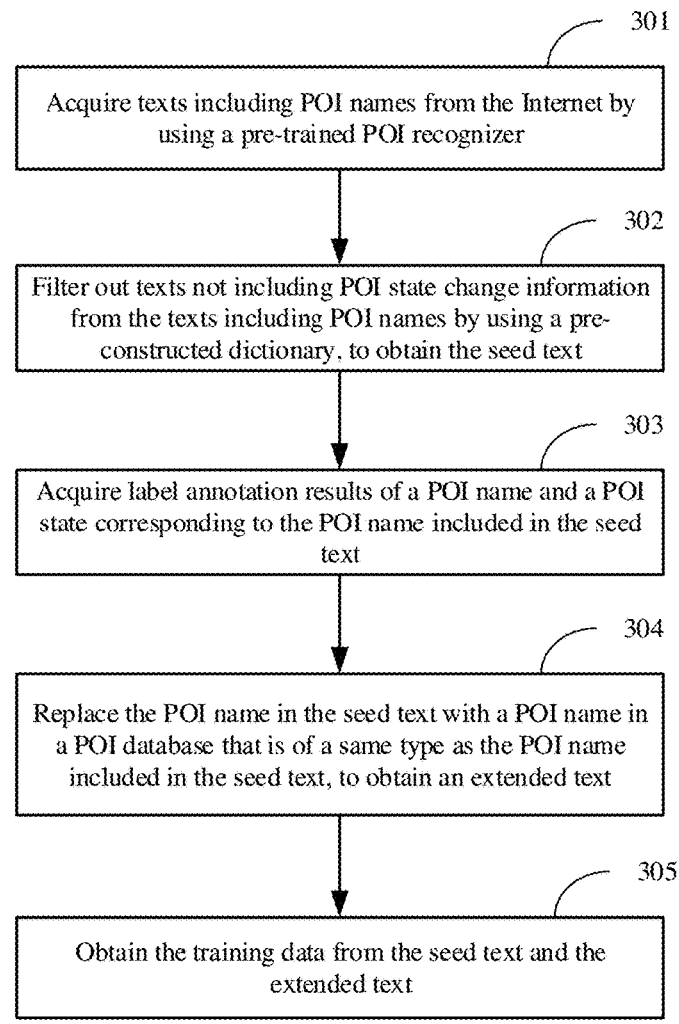
FIG. 3 is a flowchart of a method for acquiring training data according to an embodiment of the present disclosure.

During the acquisition of the training data, some texts including POI names and POI states may be annotated manually as training data. However, due to human power constraints, only a small amount of data can be produced in this manner, which may restrict the accuracy of model training to some extent. Herein, as a preferred implementation, the training data may be acquired in the manner shown in FIG. 3, which specifically includes the following steps.

In 301, texts including POI names are acquired from the Internet by using a pre-trained POI recognizer.

Internet texts are crawled from web pages. In order to ensure that the texts include POI information, a POI recognizer may be trained, and texts including POI information recognized by the POI recognizer are retained.

A process of pre-training the POI recognizer involves: extracting POI information from a POI database, wherein the extracted POI information may be popular POI information, which may be POI information whose retrieval popularity exceeds a certain degree, for example, POI information whose number of retrievals exceeds a preset number threshold within a specified period; then searching the Internet by using the extracted POI information, and training a label prediction model by using the found text and the corresponding POI information, to obtain the POI recognizer. The POI recognizer can output the POI information included in the text after the text is inputted. The POI information may include a POI name. It is to be noted that, in the present disclosure, the POI name refers to information that identifies and distinguishes a POI, which may be a Chinese name, an English name, a name abbreviation, or the like.

The label prediction model used in the process of training the POI recognizer may be of a structure formed by a Long Short-Term Memory (LSTM) network or a conditional random field (CRF). Certainly, other types of structures may also be adopted, which are not enumerated and described in detail herein.

In 302, texts not including POI state change information are filtered out from the texts including POI names by using a pre-constructed dictionary, to obtain the seed text.

The dictionary includes words expressing the POI state change information. In order to ensure that a text includes information describing POI state changes, a dictionary is pre-constructed. Meanings of words in the dictionary are related to the POI state changes. The POI state changes may include NEW, RELOCATE, RENAME and CLOSE.

After the processing of 301 and 302, the seed text obtained includes a POI name and POI state change information. 301 and 302 are a preferred implementation to acquire the seed text. In addition, the seed text may also be obtained by simply constructing the text manually.

In 303, label annotation results of a POI name and a POI state corresponding to the POI name included in the seed text are acquired.

The seed text acquired in this step is not large in number, and thus may be manually annotated. However, if a small number of seed texts are used as training data to train the POI state recognition model, the accuracy of the POI state recognition model may not be high enough. In order to further improve a training effect, data of the seed text may be enhanced on this basis by using the POI database. In 304, the POI name in the seed text is replaced with a POI name in a POI database that is of a same type as the POI name included in the seed text, to obtain an extended text.

Specifically, the POI name included in the seed text and the POI names in the POI database may be classified by using a classification model. Categories obtained by classification are used for distinguishing POI characteristics, for example, Restaurant, Company, Residence, and so on.

For example, if a seed text is "A 公司已搬迁, 搬迁期间暂停办理业务 (Company A has been relocated, and the business is suspended during the relocation)", in which the POI name "A 公司 (Company A)" included in the seed text falls within the category of Company, POI names of a same type "B 公司 (Company B)", "C 公司 (Company C)" and so on may be found in the POI database. After the Company "A" in the seed text is replaced with such names, extended texts, i.e., "B 公司已搬迁, 搬迁期间暂停办理业务 (Company B has been relocated, and the business is suspended during the relocation)", "C 公司已搬迁, 搬迁期间暂停办理业务 (Company C has been relocated, and the business is suspended during the relocation)" and so on, may be obtained.

The classification model may be pre-trained with a large number of POI names and type labels in the POI database. The classification model may be of a structure formed by, for example, bidirectional LSTM and Softmax.

In 305, the training data is obtained from the seed text and the extended text.

After the seed text is extended, a large number of extended texts may be obtained, and then the seed text and the extended texts jointly form the training data. The training data includes the text and the label annotation results of the POI name and the POI state corresponding to the POI name included in the text.

Step 202 "taking the text as input to the POI state recognition model, and taking the label annotation results of the POI name and the POI state included in the text as target prediction results of the POI state recognition model, to train the POI state recognition model" is described below in detail with reference to embodiments.

Figure 4:
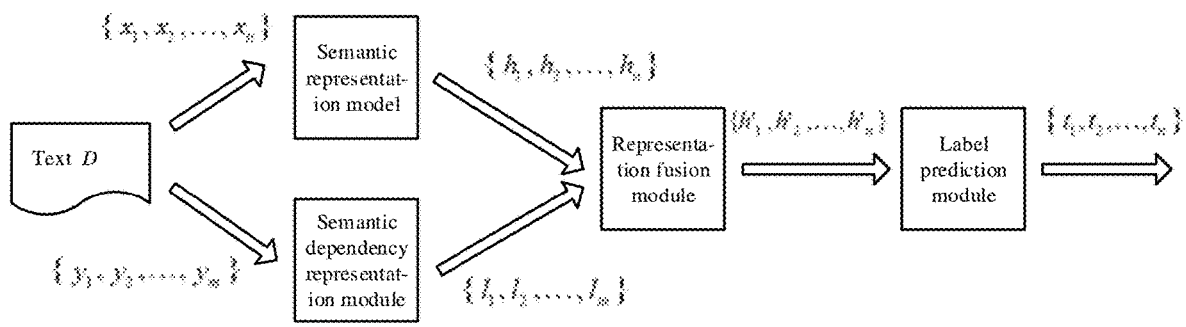
FIG. 4 is a schematic diagram of a POI state recognition model according to an embodiment of the present disclosure.

The POI state recognition model involved in the present disclosure, as shown in FIG. 4, mainly includes four parts, i.e., a semantic representation model, a semantic dependency representation module, a representation fusion module and a label prediction module.

The semantic representation module is configured to acquire a vector representation of each first semantic unit in the text. In the present disclosure, the first semantic unit may be a character, which is more common in Chinese. In English, the first semantic unit may be a word or more fine-grained, such as each "word" in a compound word. For example, "yellowstone" may be used as a first semantic unit, and "yellow" and "stone" may also be used as first semantic units respectively.

Semantic features of each word may be extracted by using a conventional word2vec model and a conventional glove model. However, since POI names often use long tail words, the conventional model cannot well express the semantics of each word. Therefore, a preferred implementation is adopted in the present disclosure, in which semantic features of word sequences corresponding to a text are extracted by using a pre-trained language model such as Enhanced Representation from kNowledge IntEgration (ERNIE) or Bidirectional Encoder Representations from Transformers (BERT). Since a subword strategy is used in the ERNIE model, that is, a POI name is split into more fine-grained words by using a Byte-Pair Encoding (BPE) algorithm, so as to efficiently solve the problem of long tail words.

It is assumed that a word sequence corresponding to a text D in training data is expressed as $\{x_1, x_2, \ldots, x_n\}$, where n denotes a number of words in D. $\{x_1, x_2, \ldots, x_n\}$ is taken as input to the ERNIE model. The ERNIE model outputs a hidden layer vector sequence $\{h_1, h_2, \ldots, h_n\}$ after extracting the semantic features. $h_i$ denotes a vector representation corresponding to the word $x_i$.

The semantic dependency representation module is configured to acquire a vector representation of each second semantic unit in the text based on semantic dependency information of the text.

Specifically, the text may be semantically analyzed to obtain a semantic dependency tree of the text. Then, a directed graph corresponding to the semantic dependency tree is acquired, and each node in the directed graph is each second semantic unit. A vector representation of each node in the directed graph is acquired by using a relational graph convolutional network (RGCN).

The semantic dependency tree of the text may be obtained by parsing the text by using a dependency parser. Dependency parsing is one of the core technologies of natural language processing, which is intended to determine a syntactic structure of a sentence by analyzing a dependency relationship between terms. Generally, processing such as word segmentation, part-of-speech tagging, named entity recognition and grammar analysis is generally performed on the text. The dependency parser is a mature tool at present. The present disclosure may be implemented directly using such a tool.

The second semantic unit in the present disclosure may be a term. In addition, the second semantic unit may also be a phrase, a combination of terms, or the like. Here, the term is taken as an example.

In the semantic dependency tree, nodes are terms in text, and edges are semantic relationships between the terms. The semantic dependency tree may be converted into a directed graph. In the directed graph, nodes are terms in text, and edges reflect semantic relationships between the terms.

Then, the directed graph serves as input to the RGCN, and a vector representation of each node in the directed graph is outputted from the RGCN.

For the semantic dependency representation module, a word sequence corresponding to D is expressed as $\{y_1, y_2, \ldots, y_m\}$, where m denotes a number of terms in D. After the semantic dependency representation module, vector representations corresponding to the terms obtained are $\{l_1, l_2, \ldots, l_m\}$ respectively.

The representation fusion module is configured to fuse the vector representation of each first semantic unit and the vector representation of each second semantic unit to obtain a fusion vector representation of each first semantic unit.

The representation fusion module may adopt, but not limited to, the following two manners.

In a first manner, if the second semantic unit includes the first semantic unit, the vector representation of each first semantic unit and the vector representation of each second semantic unit are spliced to obtain the fusion vector representation of each first semantic unit.

For example, the first semantic unit is a word and the second semantic unit is a term. Assuming that a word A consists of a word A1 and a word A2, a vector representation of the word A1 and a vector representation of the word A are spliced to obtain a fusion vector representation of the word A1, and a vector representation of the word A2 and the vector representation of the word A are spliced to obtain a fusion vector representation of the word A2.

In a second manner, attention processing is performed on the first semantic unit with the vector representation of each second semantic unit, to obtain the fusion vector representation of each first semantic unit.

For example, the first semantic unit is a word and the second semantic unit is a term. Attention processing is performed on the vector representation of the word A1 with vector representations of all words obtained. Since the second semantic unit is acquired from the directed graph, attention processing is actually performed on the word A1 by using the whole directed graph, so as to obtain a vector representation of the whole directed graph with respect to the word A1. That is, the vector representation of the word may be taken as a query, and the vector representation of each term is taken as a key, so as to perform attention processing.

The label prediction module is configured to predict labels of the POI name and a POI state based on the fusion vector representation of each first semantic unit.

Label prediction may be performed by using a sequence prediction model such as a CRF. For a document D including n words, $D = \{x_1, x_2, \ldots, x_n\}$. After the fusion by the representation fusion module, fusion vector representations of the words are obtained, that is, a sequence {h'$_1$, h'$_2$, ..., h'$_n$}. For each word x$_i$ in the document, a task of the label prediction module is to predict its label t$_i$, where t$_i \in T^p$. During the label prediction, a label for a word x$_i$ indicates whether the word x$_i$ is a POI name or a POI state. That is, a label may indicate a POI name and POI state information at the same time. For example, a label set may be:

$T^p$={B-NEW,I-NEW,B-RELOCATE,I-RELOCATE,B-RENAME,I-RENAME,B-CLOSE,I-CLOSE,B-NONE,I-NONE,O} where B, I and O indicate that the word is the beginning and the middle of a POI name and a non-POI name.

NEW, RELOCATE, RENAME, CLOSE and NONE indicate that the POI state is new, renamed, relocated, closed and unrecognized, respectively.

Therefore, the label B-NEW indicates that the word is the beginning of the POI name and the POI state is NEW. The label I-NEW indicates that the word is the middle of the POI name and the POI state is NEW. Other labels are similar.

If a prediction sequence outputted by the submodel is T={t$_1$, t$_2$, ..., t$_n$}, a score of the sequence may be obtained:

$$s(D, T) = \sum_{i=1}^{n} p_i^{t_i} + \sum_{i=0}^{n} T_{t_i, t_{(i+1)}}$$

where $p_i^{t_i}$=soft max($W_{t_i}^T h'_i$), $W_{t_i}$ denotes a weight parameter, which is one of model parameters. $W_{t_i} \in \Re^{\{2d \times c\}}$, where $\Re$ represents a real number field, d denotes a dimension of h'$_i$, and c denotes a number of labels outputted by the model. $T_{t_i, t_{(i+1)}}$ denotes a transition probability matrix from t$_i$ to t$_{i+1}$.

Finally, a probability of each prediction sequence T may be obtained by using a softmax layer.

$$p(T|D) = \frac{e^{s(D,T)}}{\sum_{\tilde{T} \in T_D} e^{s(D,\tilde{T})}}$$

where T$_D$ denotes a set formed by all prediction sequences.

A loss function used in a training stage is $$L_\theta = \sum_i \log(p(T|D)).$$

During the training, the model parameters are updated by using the value of the loss function, including parameter values of the semantic representation module, the semantic dependency representation module, the representation fusion module and the label prediction module, until a training end condition is reached. The training end condition may include: the value of the loss function is less than or equal to a preset loss function threshold, a number of iterations reaches a preset number threshold, and so on.

The POI state recognition model finally trained can recognize the inputted text to obtain a two-tuple in the text. The two-tuple includes a POI name and POI state information corresponding to the POI name, expressed as (POI name, state information).

Figure 5:
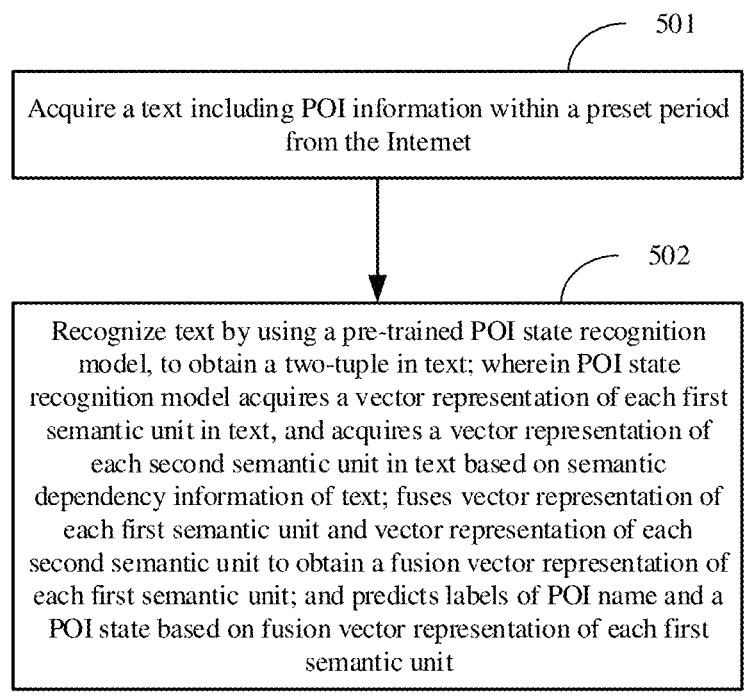
FIG. 5 is a flowchart of a method for acquiring POI state information according to an embodiment of the present disclosure.

FIG. 5 is a flowchart of a method for acquiring POI state information according to an embodiment of the present disclosure. The method is based on the POI state recognition model established by the process shown in FIG. 2. As shown in FIG. 5, the method may include the following steps.

In 501, a text including POI information within a preset period is acquired from the Internet.

In order to ensure the real-time performance of the POI state information, a text within a most recent period may be crawled from the Internet, then POI information of the acquired text may be recognized by the pre-trained POI recognizer, and the text including the POI information is retained.

Refer to the related descriptions about step 301 in the above embodiment for related descriptions about the POI recognizer, which is not described in detail herein.

In 502, the text is recognized by using a pre-trained POI state recognition model, to obtain a two-tuple in the text, that is, (POI name, state information).

The POI state recognition model acquires a vector representation of each first semantic unit in the text, and acquires a vector representation of each second semantic unit in the text based on semantic dependency information of the text, fuses the vector representation of each first semantic unit and the vector representation of each second semantic unit to obtain a fusion vector representation of each first semantic unit; and predicts labels of the POI name and a POI state based on the fusion vector representation of each first semantic unit.

In step 502, the text may be recognized by using the POI state recognition model shown in FIG. 4.

The semantic representation module is configured to acquire a vector representation of each first semantic unit in the text. In the present disclosure, the first semantic unit may be a character, which is more common in Chinese. In English, the first semantic unit may be a word or more fine-grained, such as each "word" in a compound word.

Semantic features of each word may be extracted by using a conventional word2vec model and a conventional glove model. However, since POI names often use long tail words, the conventional model cannot well express the semantics of each word. Therefore, a preferred implementation is used in the present disclosure, in which semantic features of a word sequence corresponding to the text are extracted by using a pre-trained language model such as ERNIE or BERT. Since a subword strategy is used in the ERNIE model, that is, a POI name is split into more fine-grained words by using a BPE algorithm, so as to efficiently solve the problem of long tail words.

The semantic dependency representation module is configured to acquire a vector representation of each second semantic unit in the text based on semantic dependency information of the text.

Specifically, the text may be semantically analyzed to obtain a semantic dependency tree of the text. Then, a directed graph corresponding to the semantic dependency tree is acquired, and each node in the directed graph is each second semantic unit. A vector representation of each node in the directed graph is acquired by using an RGCN.

The representation fusion module is configured to fuse the vector representation of each first semantic unit and the vector representation of each second semantic unit to obtain a fusion vector representation of each first semantic unit.

The representation fusion module may adopt, but not limited to, the following two manners.

In a first manner, if the second semantic unit includes the first semantic unit, the vector representation of the first semantic unit and the vector representation of the second semantic unit are spliced to obtain the fusion vector representation of the first semantic unit.

In a second manner, an attention processing is performed on the first semantic unit with the vector representation of each second semantic unit, to obtain the fusion vector representation of the first semantic unit.

The label prediction module is configured to predict labels of the POI name and a POI state based on the fusion vector representation of each first semantic unit. Label prediction may be performed by using a sequence prediction model such as a CRF. The predicted label may indicate the POI name and the POI state information at the same time.

Specific implementations of the modules in the POI state recognition model may be obtained with reference to the related descriptions in the embodiment shown in FIG. 2, which are not described in detail herein one by one.

For example, it is assumed that the inputted text is "继坪山图书馆开业之后，坪山艺术博物馆也在3月30日正式开业 (Following the opening of the Pingshan Library, the Pingshan Art Museum was also officially opened on March 30)".

After the prediction by the POI state recognition model, the label is shown in FIG. 6. A two-tuple (坪山图书馆 (Pingshan Library), NEW) and (坪山艺术博物馆 (Pingshan Art Museum), NEW) may be determined.

After a series of two-tuples are mined for the Internet text, the mined two-tuples may be compared with the POI names and corresponding POI state information recorded in the POI database. If they are inconsistent, the POI names and corresponding POI state information recorded in the POI database may be updated by using the mined two-tuples.

During the update, accuracy of the two-tuple may be measured according to a number of occurrences of the mined two-tuple. For example, a two-tuple whose number of occurrences is greater than a preset number threshold is considered to be accurate, and the POI database may be updated by using the accurate two-tuple.

The above is a detailed description about the method according to the present disclosure. The following is a detailed description about the apparatus according to the present disclosure with reference to embodiments.

Figure 7:
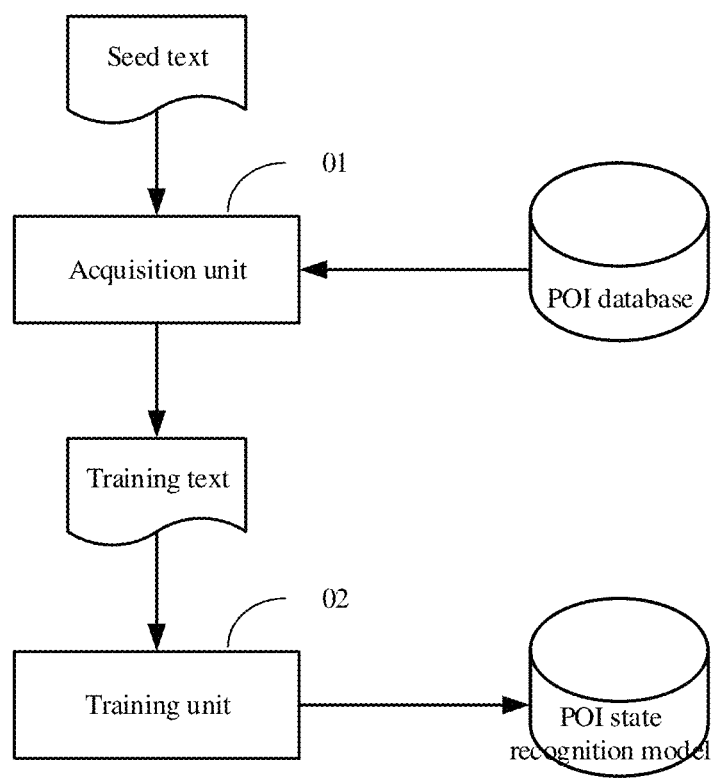
FIG. 7 is a structural diagram of an apparatus for establishing a POI state recognition model according to an embodiment of the present disclosure.

FIG. 7 is a structural diagram of an apparatus for establishing a POI state recognition model according to an embodiment of the present disclosure. As shown in FIG. 7, the apparatus may include: an acquisition unit 01 and a training unit 02. Main functions of the component units are as follows.

The acquisition unit 01 is configured to acquire training data, the training data including: a text and label annotation results of a POI name and a POI state included in the text.

The acquisition unit 01 may acquire a seed text and label annotation results of a POI name and a POI state corresponding to the POI name included in the seed text; replace the POI name in the seed text with a POI name in a POI database that is of a same type as the POI name included in the seed text, to obtain an extended text; and obtain the training data from the seed text and the extended text.

when acquiring the seed text, the acquisition unit 01 may acquire texts including POI names from the Internet, filter out texts not including POI state change information from the texts including POI names by using a pre-constructed dictionary, to obtain the seed text; wherein the dictionary includes words expressing the POI state change information.

The training unit 02 is configured to take the text as input to the POI state recognition model, and take the label annotation results of the POI name and the POI state included in the text as target prediction results of the POI state recognition model, to train the POI state recognition model.

The POI state recognition model, as shown in FIG. 4, may include the following modules.

A semantic representation module is configured to acquire a vector representation of each first semantic unit in the text.

Specifically, the semantic representation module may extract semantic features of each first semantic unit in the text through a pre-trained language model such as ERNIE or BERT, to obtain the vector representation of each first semantic unit.

A semantic dependency representation module is configured to acquire a vector representation of each second semantic unit in the text based on semantic dependency information of the text.

As a preferred implementation, the semantic representation module may semantically analyze the text to obtain a semantic dependency tree of the text; acquire a directed graph corresponding to the semantic dependency tree, each node in the directed graph being each second semantic unit; and acquire a vector representation of each node in the directed graph by using an RGCN.

The representation fusion module is configured to fuse the vector representation of each first semantic unit and the vector representation of each second semantic unit to obtain a fusion vector representation of each first semantic unit.

The representation fusion module may adopt, but not limited to, the following two manners.

In a first manner, if the second semantic unit includes the first semantic unit, the vector representation of the first semantic unit and the vector representation of the second semantic unit are spliced to obtain the fusion vector representation of the first semantic unit.

In a second manner, attention processing is performed on the first semantic unit with the vector representation of each second semantic unit, to obtain the fusion vector representation of the first semantic unit.

A label prediction module is configured to predict labels of the POI name and a POI state based on the fusion vector representation of each first semantic unit.

As a preferred implementation, the label prediction module may map a fusion vector of each first semantic unit by using a CRF model, to obtain a label of each first semantic unit. The label indicates whether to be the POI name and the POI state.

Figure 8:
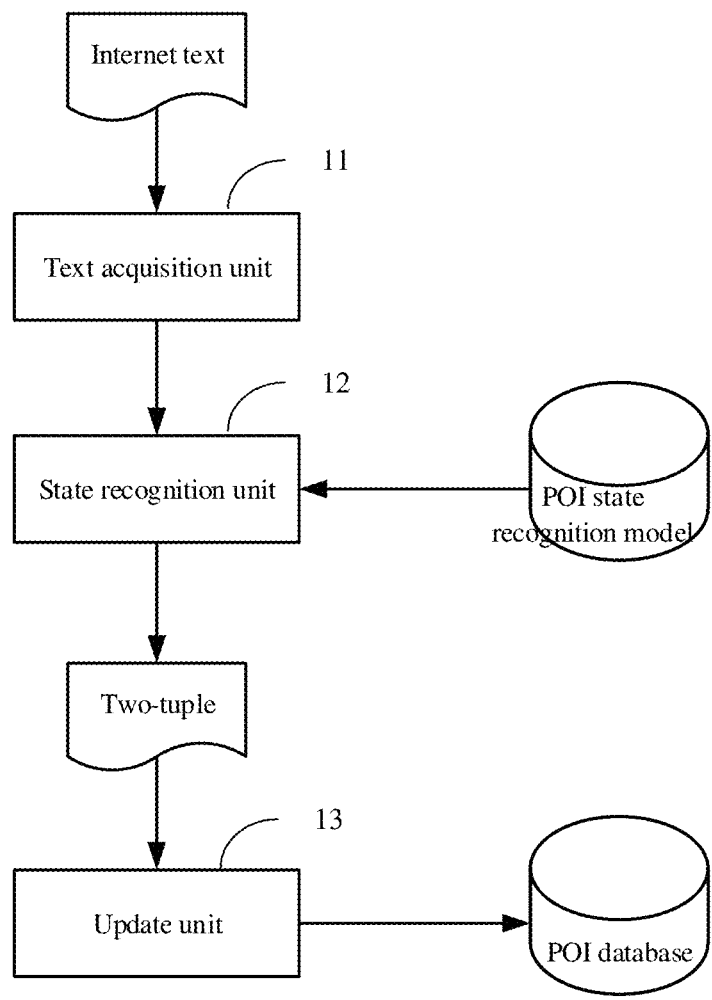
FIG. 8 is a structural diagram of an apparatus for acquiring POI state information according to an embodiment of the present disclosure.

FIG. 8 is a structural diagram of an apparatus for acquiring POI state information according to an embodiment of the present disclosure. As shown in FIG. 8, the apparatus may include: a text acquisition unit 11 and a state recognition unit 12, and may further include an update unit 13. Main functions of the component units are as follows.

The text acquisition unit 11 is configured to acquire a text including POI information within a preset period from the Internet.

As a preferred implementation, the text acquisition unit 11 may acquire texts within the preset period from the Internet; recognize POI information of the acquired texts by using a pre-trained POI recognizer; and retain the text including the POI information.

The state recognition unit 12 is configured to recognize the text by using a pre-trained POI state recognition model, to obtain a two-tuple in the text, the two-tuple including a POI name and POI state information corresponding to the POI name.

The POI state recognition model, as shown in FIG. 4, may include the following modules.

A semantic representation module is configured to acquire a vector representation of each first semantic unit in the text.

Specifically, the semantic representation module may extract semantic features of each first semantic unit in the text through a pre-trained language model such as ERNIE or BERT, to obtain the vector representation of each first semantic unit.

A semantic dependency representation module is configured to acquire a vector representation of each second semantic unit in the text based on semantic dependency information of the text.

As a preferred implementation, the semantic representation module may semantically analyze the text to obtain a semantic dependency tree of the text; acquire a directed graph corresponding to the semantic dependency tree, each node in the directed graph being each second semantic unit; and acquire a vector representation of each node in the directed graph by using an RGCN.

The representation fusion module is configured to fuse the vector representation of each first semantic unit and the vector representation of each second semantic unit to obtain a fusion vector representation of each first semantic unit.

The representation fusion module may adopt, but not limited to, the following two manners.

In a first manner, if the second semantic unit includes the first semantic unit, the vector representation of the first semantic unit and the vector representation of the second semantic unit are spliced to obtain the fusion vector representation of the first semantic unit.

In a second manner, attention processing is performed on the first semantic unit with the vector representation of each second semantic unit, to obtain the fusion vector representation of the first semantic unit.

A label prediction module is configured to predict labels of the POI name and a POI state based on the fusion vector representation of each first semantic unit.

As a preferred implementation, the label prediction module may map a fusion vector of each first semantic unit by using a CRF model, to obtain a label of each first semantic unit. The label indicates whether to be the POI name and the POI state.

The update unit 13 is configured to update the POI database by using the obtained two-tuple.

After a series of two-tuples are mined for the Internet text, the update unit 13 may compare the mined two-tuples with the POI names and corresponding POI state information recorded in the POI database. If they are inconsistent, the POI names and corresponding POI state information recorded in the POI database may be updated by using the mined two-tuples.

During the update, the update unit 13 may measure accuracy of the two-tuple according to a number of occurrences of the mined two-tuple. For example, a two-tuple whose number of occurrences is greater than a preset number threshold is considered to be accurate, and the POI database may be updated by using the accurate two-tuple.

Specific application examples are listed below.

Texts including POI information within the last month are acquired from the Internet. Such texts may be large in number. Here are a few examples.

Internet text 1: 上海大学科技园区 与上海望源企业发展有限公司在宝山区 罗森宝商务中心揭牌 建立上大望源科技园 (Shanghai University Science and Technology Park and Shanghai Wangyuan Enterprise Development Co., Ltd. established Shanghai University Wangyuan Science and Technology Park in Rosenborg Business Center, Baoshan District).

Internet text 2: 之前火岩大峡谷 在申报风景区时，已更名为乌龙山大峡谷 (Fire Rock Grand Canyon has been renamed as Wulongshan Grand Canyon during the declaration of a scenic spot).

Internet text 3: 嵩明县不动产登记中心于 2019 年 6 月 28 日搬迁至秀嵩街 号办公，搬迁期间暂停办理业务 (Songming County Real Estate Registration Center moved to No. 66 Xiusong Street on Jun. 28, 2019, and suspended business during the relocation).

Internet text 4: 为了保护三江源的自然生态环境，年保玉则风景区已全面关闭 (In order to protect the natural ecological environment of Sanjiangyuan, Nianbaoyuze Scenic Area has been completely closed).

The acquired Internet texts including the POI information are inputted to the POI state recognition model respectively. The POI state recognition model can more accurately recognize two-tuples therein based on semantic interdependence of words in the text. Recognition results are as follows:

Two-tuple corresponding to Internet text 1: (上大望源科技园 (Shanghai University Wangyuan Science and Technology Park), NEW);

Two-tuple corresponding to Internet text 2: (火岩大峡谷 (Wulongshan Grand Canyon), RENAME);

Two-tuple corresponding to Internet text 3: (嵩明县不动产登记中心 (Songming County Real Estate Registration Center), RELOCATE); and Two-tuple corresponding to Internet text 4: (年保玉则风景区 (Nianbaoyuze Scenic Area), CLOSE).

For a large number of two-tuples acquired, the accuracy thereof may be determined according to a number of occurrences. For example, if the number of times a two-tuple is recognized exceeds a preset threshold, the two-tuple is considered to be accurate, and may be used to update the POI database. The accuracy of the acquired two-tuple may also be verified manually.

After the above process, POI state information that has changed, such as NEW, RELOCATE, RENAME and CLOSE, can be automatically and duly mined from Internet documents, and the POI database may be updated in a timely manner, so that services provided using the POI database are based on accurate POI information, thereby improving user experience.

As can be seen from the above embodiments, the present disclosure may have the following advantages.

1) In the present disclosure, POI names and POI state information corresponding to the POI names are mined from Internet texts including POI information, which makes full use of timely responses of the Internet to POI state change events, saves labor costs and improves timeliness and accuracy compared with the manner of determining POI information with state changes manually.

2) The present disclosure can not only recognize the POI state change information included in the Internet text, but also recognize specific POI state information of changes in POI names.

3) In the present disclosure, semantic dependency information is incorporated into the established POI state recognition model to help the model recognize the POI names in the text more accurately and understand the state of each POI, so as to improve the accuracy of recognition.

4) In the present disclosure, during the training of the POI state recognition model, data of the seed text is extended by using the POI database to obtain training data, so as to extend the number of training texts and improve the accuracy of the POI state recognition model.

5) In the POI state recognition model according to the present disclosure, semantic features of a word sequence corresponding to the inputted text are extracted by using an ERNIE model, so as to effectively solve the problem of long tail words in the POI names.

6) In the present disclosure, the POI database is updated by using the mined two-tuple, so that subsequent services provided based on the POI database are more accurate, thereby improving user experience.

According to embodiments of the present disclosure, the present disclosure further provides an electronic device, a readable storage medium and a computer program product.

Figure 9:
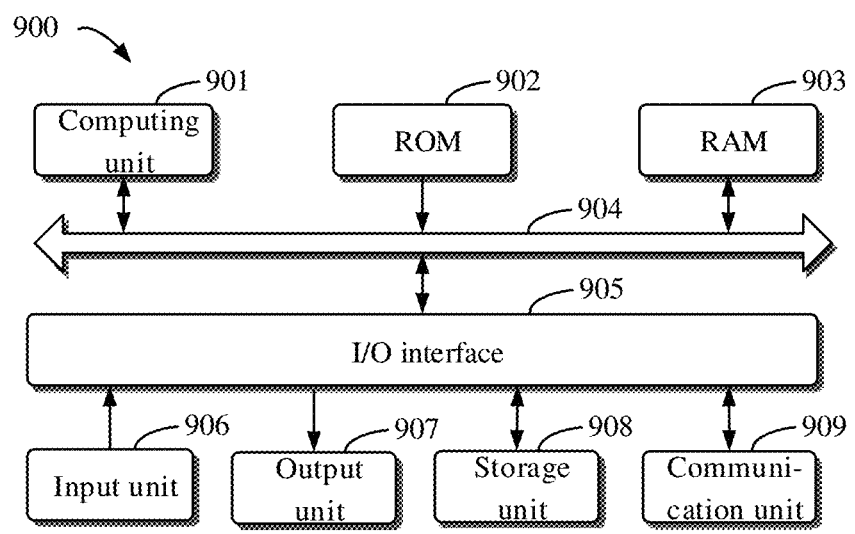
FIG. 9 is a block diagram of an electronic device configured to implement embodiments of the present disclosure.

FIG. 9 is a block diagram of an electronic device configured to perform a method for acquiring POI state information or establishing a POI state recognition model according to embodiments of the present disclosure. The electronic device is intended to represent various forms of digital computers, such as laptops, desktops, workbenches, personal digital assistants, servers, blade servers, mainframe computers and other suitable computing devices. The electronic device may further represent various forms of mobile devices, such as personal digital assistants, cellular phones, smart phones, wearable devices and other similar computing devices. The components, their connections and relationships, and their functions shown herein are examples only, and are not intended to limit the implementation of the present disclosure as described and/or required herein.

As shown in FIG. 9, the device 900 includes a computing unit 901, which may perform various suitable actions and processing according to a computer program stored in a read-only memory (ROM) 902 or a computer program loaded from a storage unit 908 into a random access memory (RAM) 903. The RAM 903 may also store various programs and data required to operate the device 900. The computing unit 901, the ROM 902 and the RAM 903 are connected to one another by a bus 904. An input/output (I/O) interface 905 is also connected to the bus 904.

A plurality of components in the device 900 are connected to the I/O interface 905, including an input unit 906, such as a keyboard and a mouse; an output unit 907, such as various displays and speakers; a storage unit 908, such as disks and discs; and a communication unit 909, such as a network card, a modem and a wireless communication transceiver. The communication unit 909 allows the device 900 to exchange information/data with other devices over computer networks such as the Internet and/or various telecommunications networks.

The computing unit 901 may be a variety of general-purpose and/or special-purpose processing components with processing and computing capabilities. Some examples of the computing unit 901 include, but are not limited to, a central processing unit (CPU), a graphics processing unit (GPU), various artificial intelligence (AI) computing chips, various computing units that run machine learning model algorithms, a digital signal processor (DSP), and any appropriate processor, controller or microcontroller, etc. The computing unit 901 performs the methods and processing described above, such as the method for acquiring POI state information or establishing a POI state recognition model. For example, in some embodiments, the method for acquiring POI state information or establishing a POI state recognition model may be implemented as a computer software program that is tangibly embodied in a machine-readable medium, such as the storage unit 908.

In some embodiments, part or all of a computer program may be loaded and/or installed on the device 900 via the ROM 902 and/or the communication unit 909. One or more steps of the method for acquiring POI state information or establishing a POI state recognition model described above may be performed when the computer program is loaded into the RAM 903 and executed by the computing unit 901. Alternatively, in other embodiments, the computing unit 901 may be configured to perform the method for acquiring POI state information or establishing a POI state recognition model by any other appropriate means (for example, by means of firmware).

Various implementations of the systems and technologies disclosed herein can be realized in a digital electronic circuit system, an integrated circuit system, a field programmable gate array (FPGA), an application-specific integrated circuit (ASIC), an application-specific standard product (ASSP), a system on chip (SOC), a load programmable logic device (CPLD), computer hardware, firmware, software, and/or combinations thereof. Such implementations may include implementation in one or more computer programs that are executable and/or interpretable on a programmable system including at least one programmable processor, which can be special or general purpose, configured to receive data and instructions from a storage system, at least one input apparatus, and at least one output apparatus, and to transmit data and instructions to the storage system, the at least one input apparatus, and the at least one output apparatus.

Program codes configured to implement the methods in the present disclosure may be written in any combination of one or more programming languages. Such program codes may be supplied to a processor or controller of a general-purpose computer, a special-purpose computer, or another programmable data processing apparatus to enable the function/operation specified in the flowchart and/or block diagram to be implemented when the program codes are executed by the processor or controller. The program codes may be executed entirely on a machine, partially on a machine, partially on a machine and partially on a remote machine as a stand-alone package, or entirely on a remote machine or a server.

In the context of the present disclosure, machine-readable media may be tangible media which may include or store programs for use by or in conjunction with an instruction execution system, apparatus or device. The machine-readable media may be machine-readable signal media or machine-readable storage media. The machine-readable media may include, but are not limited to, electronic, magnetic, optical, electromagnetic, infrared, or semiconductor systems, apparatuses or devices, or any suitable combinations thereof. More specific examples of machine-readable storage media may include electrical connections based on one or more wires, a portable computer disk, a hard disk, a random access memory (RAM), a read-only memory (ROM), an erasable programmable read only memory (EPROM or flash memory), an optical fiber, a compact disk read only memory (CD-ROM), an optical storage device, a magnetic storage device, or any suitable combination thereof.

To provide interaction with a user, the systems and technologies described here can be implemented on a computer. The computer has: a display apparatus (e.g., a cathode-ray tube (CRT) or a liquid crystal display (LCD) monitor) for displaying information to the user; and a keyboard and a pointing apparatus (e.g., a mouse or trackball) through which the user may provide input for the computer. Other kinds of apparatuses may also be configured to provide interaction with the user. For example, a feedback provided for the user may be any form of sensory feedback (e.g., visual, auditory, or tactile feedback); and input from the user may be received in any form (including sound input, speech input, or tactile input).

The systems and technologies described herein can be implemented in a computing system including background components (e.g., as a data server), or a computing system including middleware components (e.g., an application server), or a computing system including front-end components (e.g., a user computer with a graphical user interface or web browser through which the user can interact with the implementation mode of the systems and technologies described here), or a computing system including any combination of such background components, middleware components or front-end components. The components of the system can be connected to each other through any form or medium of digital data communication (e.g., a communication network). Examples of the communication network include: a local area network (LAN), a wide area network (WAN) and the Internet.

The computer system may include a client and a server. The client and the server are generally far away from each other and generally interact via the communication network. A relationship between the client and the server is generated through computer programs that run on a corresponding computer and have a client-server relationship with each other.

It should be understood that the steps can be reordered, added, or deleted using the various forms of processes shown above. For example, the steps described in the present application may be executed in parallel or sequentially or in different sequences, provided that desired results of the technical solutions disclosed in the present disclosure are achieved, which is not limited herein.

The above specific implementations do not limit the extent of protection of the present disclosure. Those skilled in the art should understand that various modifications, combinations, sub-combinations, and replacements can be made according to design requirements and other factors. Any modifications, equivalent substitutions and improvements made within the spirit and principle of the present disclosure all should be included in the extent of protection of the present disclosure.

What is claimed is:

1. A method for acquiring point of interest (POI) state information, comprising:
    acquiring a text comprising POI information within a preset period from the Internet; and
    recognizing the text by using a pre-trained POI state recognition model, to obtain a two-tuple in the text, the two-tuple comprising a POI name and POI state information corresponding to the POI name,
    wherein the POI state recognition model is trained by the steps of:
    acquiring training data, the training data comprising: a text and label annotation results of a POI name and a POI state comprised in the text; and
    taking the text as input to the POI state recognition model, and taking the label annotation results of the POI name and the POI state comprised in the text as target prediction results of the POI state recognition model, to train the POI state recognition model;
    wherein the POI state recognition model acquires a vector representation of each first semantic unit in the text, and acquires a vector representation of each second semantic unit in the text based on semantic dependency information of the text fuses the vector representation of each first semantic unit and the vector representation of each second semantic unit to obtain a fusion vector representation of each first semantic unit; and predicts labels of the POI name and a POI state based on the fusion vector representation of each first semantic unit,
    wherein the step of acquiring training data comprises:
    acquiring a seed text and label annotation results of a POI name and a POI state corresponding to the POI name comprised in the seed text;
    replacing the POI name in the seed text with a POI name in a POI database that is of a same type as the POI name comprised in the seed text, to obtain an extended text; and
    obtaining the training data from the seed text and the extended text.

2. The method according to claim 1, wherein the step of acquiring text comprising POI information within a preset period from the Internet comprises:
    acquiring texts within the preset period from the Internet;
    recognizing POI information of the acquired texts by using a pre-trained POI recognizer; and
    retaining the text comprising the POI information.

3. The method according to claim 2, wherein the POI recognizer is trained in the following manner:
    extracting POI information from a POI database;
    searching the Internet by using the extracted POI information; and
    training a label prediction model by using the found text and the corresponding POI information, to obtain the POI recognizer.

4. The method according to claim 1, wherein the step of acquiring a vector representation of each first semantic unit in the text comprises:
    extracting semantic features of each first semantic unit in the text through a pre-trained language model, to obtain the vector representation of each first semantic unit.

5. The method according to claim 1, wherein the step of acquiring a vector representation of each second semantic unit in the text based on semantic dependency information of the text comprises:
    semantically analyzing the text to obtain a semantic dependency tree of the text;
    acquiring a directed graph corresponding to the semantic dependency tree, each node in the directed graph being each second semantic unit; and
    acquiring a vector representation of each node in the directed graph by using a relational graph convolutional network (RGCN).

6. The method according to claim 1, wherein the step of fusing the vector representation of each first semantic unit and the vector representation of each second semantic unit to obtain a fusion vector representation of each first semantic unit comprises:
    if the second semantic unit comprises the first semantic unit, splicing the vector representation of each first semantic unit and the vector representation of each second semantic unit to obtain the fusion vector representation of each first semantic unit; or
    performing attention processing on the first semantic unit with the vector representation of each second semantic unit, to obtain the fusion vector representation of each first semantic unit.

7. The method according to claim 1, wherein the step of predicting labels of the POI name and a POI state based on the fusion vector representation of each first semantic unit comprises:

mapping a fusion vector of each first semantic unit by using a conditional random field (CRF) model, to obtain a label of each first semantic unit, the label indicating whether the corresponding first semantic unit is the POI name and the POI state.

8. The method according to claim 1, wherein the first semantic unit is a character/word, and the second semantic unit is a term.

9. A method for establishing a POI state recognition model, comprising:
 acquiring training data, the training data comprising: a text and label annotation results of a POI name and a POI state comprised in the text; and
 taking the text as input to the POI state recognition model, and taking the label annotation results of the POI name and the POI state comprised in the text as target prediction results of the POI state recognition model, to train the POI state recognition model;
 wherein the POI state recognition model acquires a vector representation of each first semantic unit in the text, and acquires a vector representation of each second semantic unit in the text based on semantic dependency information of the text; fuses the vector representation of each first semantic unit and the vector representation of each second semantic unit to obtain a fusion vector representation of each first semantic unit; and predicts labels of the POI name and a POI state based on the fusion vector representation of each first semantic unit,
 wherein the step of acquiring training data comprises:
 acquiring a seed text and label annotation results of a POI name and a POI state corresponding to the POI name comprised in the seed text;
 replacing the POI name in the seed text with a POI name in a POI database that is of a same type as the POI name comprised in the seed text, to obtain an extended text; and
 obtaining the training data from the seed text and the extended text.

10. The method according to claim 9, wherein the step of acquiring a seed text comprises:
 acquiring texts comprising POI names from the Internet; and
 filtering out texts not comprising POI state change information from the texts comprising POI names by using a pre-constructed dictionary, to obtain the seed text; wherein the dictionary comprises words expressing the POI state change information.

11. The method according to claim 9, wherein the step of acquiring a vector representation of each first semantic unit in the text comprises:
 extracting semantic features of each first semantic unit in the text through a pre-trained language model, to obtain the vector representation of each first semantic unit.

12. The method according to claim 9, wherein the step of acquiring a vector representation of each second semantic unit in the text based on semantic dependency information of the text comprises:
 semantically analyzing the text to obtain a semantic dependency tree of the text;
 acquiring a directed graph corresponding to the semantic dependency tree, each node in the directed graph being each second semantic unit; and
 acquiring a vector representation of each node in the directed graph by using an RGCN.

13. The method according to claim 9, wherein the step of fusing the vector representation of each first semantic unit and the vector representation of each second semantic unit to obtain a fusion vector representation of each first semantic unit comprises:
 if the second semantic unit comprises the first semantic unit, splicing the vector representation of each first semantic unit and the vector representation of each second semantic unit to obtain the fusion vector representation of each first semantic unit; or
 performing attention processing on the first semantic unit with the vector representation of each second semantic unit, to obtain the fusion vector representation of each first semantic unit.

14. The method according to claim 9, wherein the step of predicting labels of the POI name and a POI state based on the fusion vector representation of each first semantic unit comprises:
 mapping a fusion vector of each first semantic unit by using a CRF model, to obtain a label of each first semantic unit, the label indicating whether to be the POI name and the POI state.

15. An electronic device, comprising:
 at least one processor; and
 a memory communicatively connected with the at least one processor;
 wherein the memory stores instructions executable by the at least one processor, and the instructions are executed by the at least one processor to enable the at least one processor to perform a method for acquiring point of interest (POI) state information, wherein the method comprise:
 acquiring a text comprising POI information within a preset period from the Internet; and
 recognizing the text by using a pre-trained POI state recognition model, to obtain a two-tuple in the text, the two-tuple comprising a POI name and POI state information corresponding to the POI name,
 wherein the POI state recognition model is trained by the steps of:
 acquiring training data, the training data comprising: a text and label annotation results of a POI name and a POI state comprised in the text; and
 taking the text as input to the POI state recognition model, and taking the label annotation results of the POI name and the POI state comprised in the text as target prediction results of the POI state recognition model, to train the POI state recognition model;
 wherein the POI state recognition model acquires a vector representation of each first semantic unit in the text, and acquires a vector representation of each second semantic unit in the text based on semantic dependency information of the text; fuses the vector representation of each first semantic unit and the vector representation of each second semantic unit to obtain a fusion vector representation of each first semantic unit; and predicts labels of the POI name and a POI state based on the fusion vector representation of each first semantic unit,
 wherein the step of acquiring training data comprises:
 acquiring a seed text and label annotation results of a POI name and a POI state corresponding to the POI name comprised in the seed text;
 replacing the POI name in the seed text with a POI name in a POI database that is of a same type as the POI name comprised in the seed text, to obtain an extended text; and
 obtaining the training data from the seed text and the extended text.

16. The electronic device according to claim 15, wherein the step of acquiring text comprising POI information within a preset period from the Internet comprises: acquiring texts within the preset period from the Internet; recognizing POI information of the acquired texts by using a pre-trained POI recognizer; and retaining the text comprising the POI information.

17. The electronic device according to claim 15, wherein the step of acquiring a vector representation of each first semantic unit in the text comprises: extracting semantic features of each first semantic unit in the text through a pre-trained language model, to obtain the vector representation of each first semantic unit.

18. The electronic device according to claim 15, wherein the step of acquiring a vector representation of each second semantic unit in the text based on semantic dependency information of the text comprises: semantically analyzing the text to obtain a semantic dependency tree of the text; acquiring a directed graph corresponding to the semantic dependency tree, each node in the directed graph being each second semantic unit; and acquiring a vector representation of each node in the directed graph by using an RGCN.

19. A non-transitory computer-readable storage medium storing computer instructions therein, wherein the computer instructions are used to cause the computer to perform a method for acquiring point of interest (POI) state information, wherein the method comprises:

acquiring a text comprising POI information within a preset period from the Internet; and recognizing the text by using a pre-trained POI state recognition model, to obtain a two-tuple in the text, the two-tuple comprising a POI name and POI state information corresponding to the POI name, wherein the POI state recognition model is trained by the steps of:

acquiring training data, the training data comprising: a text and label annotation results of a POI name and a POI state comprised in the text; and taking the text as input to the POI state recognition model, and taking the label annotation results of the POI name and the POI state comprised in the text as target prediction results of the POI state recognition model, to train the POI state recognition model;

wherein the POI state recognition model acquires a vector representation of each first semantic unit in the text, and acquires a vector representation of each second semantic unit in the text based on semantic dependency information of the text fuses the vector representation of each first semantic unit and the vector representation of each second semantic unit to obtain a fusion vector representation of each first semantic unit and predicts labels of the POI name and a POI state based on the fusion vector representation of each first semantic unit, wherein the step of acquiring training data comprises:

acquiring a seed text and label annotation results of a POI name and a POI state corresponding to the POI name comprised in the seed text;

replacing the POI name in the seed text with a POI name in a POI database that is of a same type as the POI name comprised in the seed text, to obtain an extended text; and obtaining the training data from the seed text and the extended text.

\* \* \* \* \*